(12) United States Patent
Miller et al.

(10) Patent No.: US 8,943,287 B1
(45) Date of Patent: Jan. 27, 2015

(54) MULTI-CORE PROCESSOR SYSTEM CONFIGURED TO CONSTRAIN ACCESS RATE FROM MEMORY

(75) Inventors: David A. Miller, Swisher, IA (US); David C. Matthews, Iowa City, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 177 days.

(21) Appl. No.: 13/550,877

(22) Filed: Jul. 17, 2012

(51) Int. Cl.
*G06F 13/00* (2006.01)
*G06F 13/28* (2006.01)
*G06F 5/06* (2006.01)

(52) U.S. Cl.
CPC ........................................ *G06F 5/06* (2013.01)
USPC ..... 711/163; 711/168; 711/167; 711/E12.024

(58) Field of Classification Search
CPC ................................... G06F 13/32; G06F 5/06
See application file for complete search history.

(56) References Cited

U.S. PATENT DOCUMENTS

| | | | |
|---|---|---|---|
| 7,813,277 B2 * | 10/2010 | Okholm et al. | ............... 370/230 |
| 7,929,431 B2 | 4/2011 | Wilt et al. | |
| 2003/0016686 A1 | 1/2003 | Wynne et al. | |
| 2007/0127521 A1 | 6/2007 | Sandell et al. | |
| 2008/0031282 A1 | 2/2008 | Vestal | |
| 2009/0217280 A1 | 8/2009 | Miller et al. | |
| 2009/0323704 A1 | 12/2009 | Hall et al. | |
| 2010/0195491 A1 | 8/2010 | Gray et al. | |
| 2010/0199280 A1 | 8/2010 | Vestal et al. | |
| 2011/0131377 A1 | 6/2011 | Gray et al. | |
| 2012/0250694 A1 | 10/2012 | Hall et al. | |

* cited by examiner

*Primary Examiner* — Eric S Cardwell
(74) *Attorney, Agent, or Firm* — Angel N. Gerdzhikov; Donna P. Suchy; Daniel M. Barbieri

(57) ABSTRACT

A multi-core processor system includes a number of cores, a memory system, and a common access bus. Each core includes a core processor; a dedicated core cache operatively connected to the core processor; and, a core processor rate limiter operatively connected to the dedicated core cache. The memory system includes physical memory; a memory controller connected to the physical memory; and, a dedicated memory cache connected to the memory controller. The common access bus interconnects the cores and the memory system. The core processor rate limiters are configured to constrain the rate at which data is accessed by each respective core processor from the memory system so that each core processor memory access is capable of being limited to an expected value.

18 Claims, 4 Drawing Sheets

MULTI-CORE PROCESSOR SYSTEM CONFIGURED TO CONSTRAIN ACCESS RATE FROM MEMORY

BACKGROUND OF THE INVENTION

1. Field of the Invention

The present invention relates generally to multi-core processor systems and more particularly to multi-core processor systems for avionics systems.

2. Description of the Related Art

In modern avionics systems (for example, in Integrated Modular Avionics (IMA) systems), partitioning operating systems are typically used to meet stringent safety- and mission-critical requirements. Aeronautical Radio Inc. (ARINC) has promulgated the "ARINC Specification 653: Avionics Application Standard Software Interface" family of specifications (generally referred to here as "ARINC 653").

ARINC 653 defines an APplication EXecutive (APEX) for space and time partitioning for enabling multiple partitions to share a single processor and memory in order to guarantee that applications executing within one partition cannot adversely affect other partitions. Each partition in such an ARINC 653 system represents a separate application and makes use of memory space that is dedicated to it. Similarly, the APEX allots a dedicated time slice to each partition, thus creating time partitioning. Each ARINC 653 partition also supports multitasking within it.

ARINC 653 was defined assuming the use of a single core processor. However, the processor industry has transitioned to multi-core processors for various reasons. As a result, most high-end processors are multi-core processors.

However, the cores and master controllers of a multi-core processor often share hardware resources and can significantly interfere with each other's performance. This interference can violate the guarantee of robust partitioning (a guarantee that partitions do not interfere with each other) that is fundamental to ARINC 653 and IMA systems. As a result, when such multi-core processors are used to implement ARINC 653 systems, all but one of the cores in the multi-core processors is typically disabled. This is a significantly inefficient use of hardware, and the inefficiency worsens as the number of cores per processor increases.

There has been a partial response to this problem U.S. Pat. Publcn. No. 20100199280, issued to S. C. Vestal, et al. entitled, "SAFE PARTITION SCHEDULING ON MULTI-CORE PROCESSORS," discloses an embodiment directed to a method of generating a set of schedules for use by a partitioning kernel to execute a plurality of partitions on a plurality of processor cores included in a multi-core processor unit. The method includes determining a duration to execute each of the plurality of partitions without interference and generating a candidate set of schedules using the respective duration for each of the plurality of partitions. The method further includes estimating how much interference occurs for each partition when the partitions are executed on the multi-core processor unit using the candidate set of schedules and generating a final set of schedules by, for at least one of the partitions, scaling the respective duration in order to account for the interference for that partition. The method further includes configuring the multi-core processor unit to use the final set of schedules to control the execution of the partitions using at least two of the cores. The necessity to support hosted functions with differing design assurance levels (DAL) that require the scheduling of partitions maintains disjoint DAL levels. This is an artificial constraint that generally generates undesired dead times. This also results in the necessity to synchronize the cores in the core processors making the design approach relatively complex. This constraint, as well as other constraints that exist, mean that the multicore processor will be less efficiently utilized. There is a need to obviate these deficiencies.

During multicore operation a concern is that a core may make excessive use of DDR memory access relative to the normal behavior. The result is that the processor capacity is significantly degraded for the other cores.

SUMMARY OF THE INVENTION

In a broad aspect, the present invention is embodied as a multi-core processor system including a plurality of cores, a memory system, and a common access bus. Each core includes a core processor; a dedicated core cache operatively connected to the core processor; and, a core processor rate limiter operatively connected to the dedicated core cache. The memory system includes physical memory; a memory controller connected to the physical memory; and, a dedicated memory cache connected to the memory controller. The common access bus interconnects the cores and the memory system. The core processor rate limiters are configured to constrain the rate at which data is accessed by each respective core processor from the memory system so that each core processor memory access is capable of being limited to an expected value. Each core is isolated for analysis without imposing system level configuration constraints.

In one preferred embodiment, the core processor rate limiter utilizes a token bucket process. The core processor rate limiter waits until a core memory access count is reached following an initialization setting, wherein event counters in each core processor rate limiter are set to a predetermined value. It invokes an exception handler for each core processor when the core memory access count is reached. It determines a memory access envelope eligibility time (ET) when the exception handler is invoked. There is a return from the exception handler if it is determined that the current time is greater than the ET. The core processor rate limiter waits until the ET is reached if it is determined that the current time is less than the ET.

In another broad aspect, the multi-core processor system includes at least one master controller system operatively connected to the common access bus capable of performing memory accesses over the common access bus. The master controller system comprises a master controller and a master controller rate limiter. The core processor and master controller rate limiters are configured to constrain the rate at which data is accessed by each respective core processor or master controller from the memory system so that each core processor or master controller memory access is capable of being limited to an expected value.

Other objects, advantages, and novel features will become apparent from the following detailed description of the invention when considered in conjunction with the accompanying drawings.

BRIEF DESCRIPTION OF THE DRAWINGS

The same elements or parts throughout the figures of the drawings are designated by the same reference characters, while equivalent elements bear a prime designation.

DETAILED DESCRIPTION OF THE INVENTION

Figure 1:
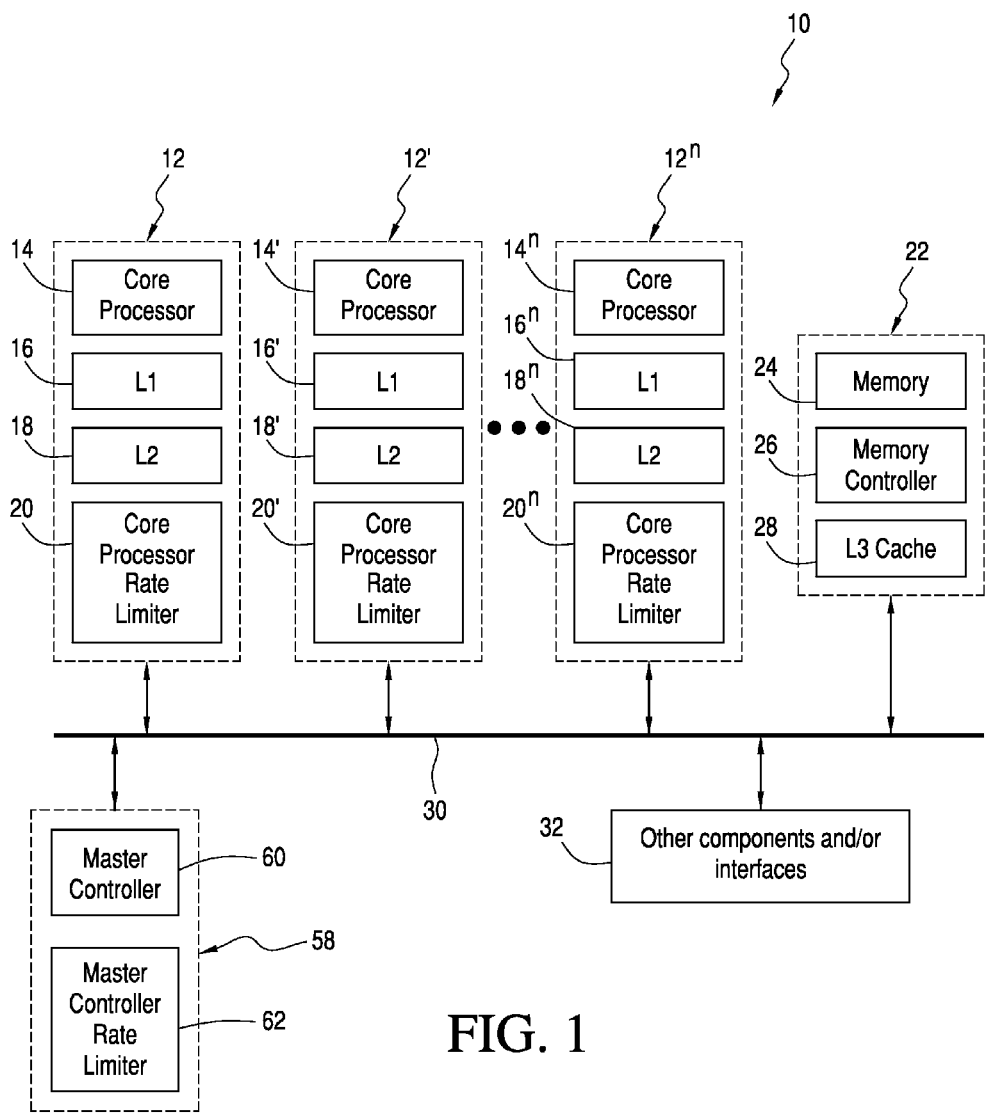
FIG. 1 is a block diagram of the multi-core processor system of the present invention.

Referring now to the drawings and the characters of reference marked thereon, FIG. 1 illustrates the multi-core processor system of the present invention, designated generally as 10. The multi-core processor system 10 includes a number of cores 12, 12', . . . 12". Each core 12 includes a core processor 14, 14', . . . 14". A dedicated core cache 16, 18; 16', 18'; . . . 16", 18" is operatively connected to each core processor 14, 14', . . . 14". Each dedicated cache 16, 18 typically includes an L1 cache 16 operatively connected to an L2 cache 18. L1 and L2 may include instructions and/or data.

Each core 12, 12', . . . 12" includes a core processor rate limiter 20, 20', . . . 20" operatively connected to the dedicated core cache 16, 18; 16', 18'; . . . 16", 18". Each core processor rate limiter 20 is self-constrained to a defined traffic constraint envelope having a burst and rate component. Each traffic constraint envelope is preferably n-way, non-decreasing, and concave. The core processor rate limiters 20 preferably utilize a token bucket process. As used herein the term "core processor" refers to an independent central processing unit. The term "multi-core" refers to a single computing component containing two or more cores.

The multi-core processor system 10 includes a memory system, designated generally as 22. The memory system 22 includes a physical memory 24, a memory controller 26 connected to the physical memory 24; and, a dedicated memory cache 28 connected to the memory controller 26. The dedicated memory cache 28 preferably comprises an L3 cache. The memory system 24 system preferably comprises double data rate (DDR) memory and more specifically DDR SDRAM memory. Alternatively, the memory system 24 may be shared memory or dual port memory.

A common access bus 30 interconnects the cores 12 and the memory system 22. The term "bus" as defined herein is meant to be interpreted broadly to include fabrics, traditional buses, cross-bar interconnects, and other subsystems that transfer data between components inside a computer, e.g. processing cores, memories, as known to those skilled in this field. The common access bus 30 connects other components and/or interfaces 32 to the multi-core processor system 10. Typical end systems 32 may be, for example, sensors, effectors, display systems, computation platforms, radios, data concentrators, audio components, engine controllers, flight control computers, etc.

The core processor rate limiters 20 are configured to constrain the rate at which data is accessed by each respective core processor 14 from the memory system 22 so that each core processor memory access is capable of being limited to an expected value. As used herein the term "access" refers to the resulting amount of cache lines read from or written to dedicated memory cache (L3) 28 by a core processor 14. This may be different than the amount of memory that the core processor 14 may have requested to be read or written to. This may deemed intuitively the opposite of what one might have desired to do. This is due to predictive spatial and temporal algorithms in the cache subsystems. As a result of rate limiting the present system provides for asynchronous operation between the core processors while the DDR bandwidth required to meet processing deadlines is guaranteed.

Figure 2:
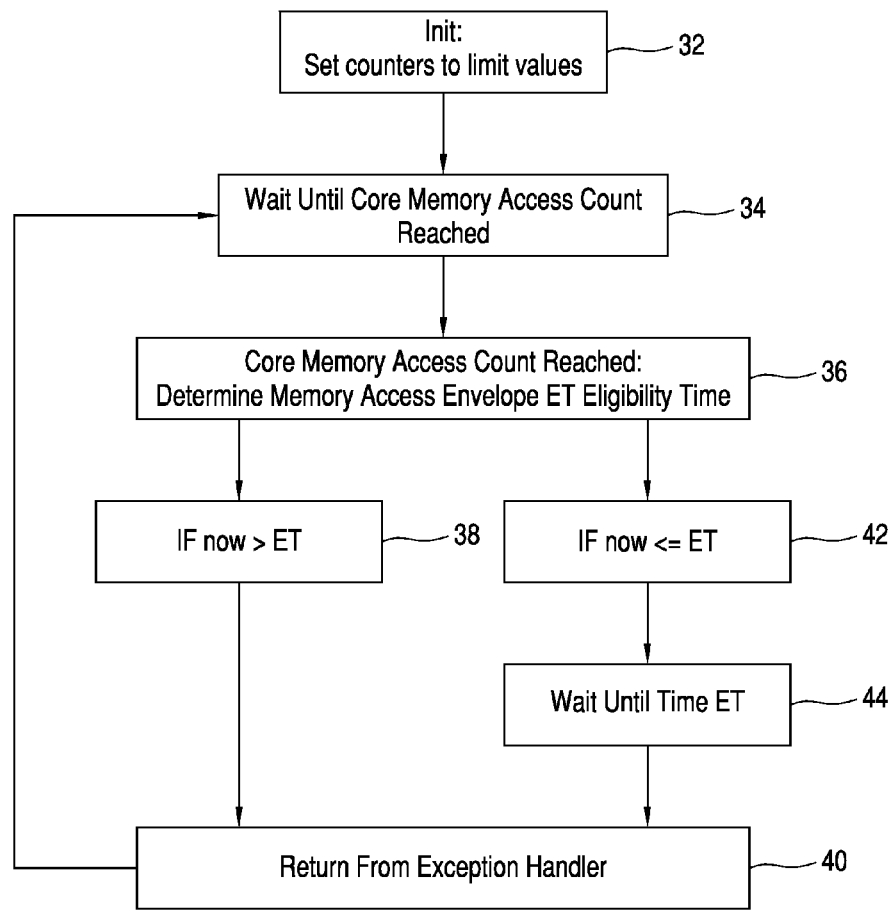
FIG. 2 is a flow diagram of a method of operation of a core processor rate limiter in accordance with one embodiment of the present invention where the core processor rate limiter is implemented using a hardware event counter, an exception handler, and software logic.

Referring now to FIG. 2, a flow diagram is illustrated of a method of operation of a core processor rate limiter in accordance with one embodiment of the present invention where the core processor rate limiter is implemented using a hardware event counter, an exception handler, and software logic.

During initialization, the counters are set to limit values (process block 32). Each core processor rate limiter utilizes a token bucket process and is configured to wait until a core memory access count is reached following an initialization setting, wherein event counters in each core processor rate limiter are set to a predetermined value. Each core processor rate limiter waits until the core memory access count is reached following the initialization setting (process block 34). An exception handler for each core processor is invoked when the core memory access count is reached. A memory access envelope eligibility time (ET) is determined when the exception handler is invoked (process block 36). There is a return from the exception handler if it is determined that the current time is greater than the ET (process blocks 38, 40). If it is determined that the current time is less than the ET, wait until the ET is reached (process blocks 42, 44).

The following algorithm may be used to limit the DDR accesses to cache in any interval T to a defined level. This allows a configured maximal DDR access rate to occur by any core in a multicore processor.

The following are run-time variables used in this algorithm:

Crunning—running count down counter tracking the number DDR access attempts. This variable is supported by the hardware and causes a DDR ACCESS LIMIT exception when the counter value reaches zero.

lastT—This is a token bucket item recording the last time the token bucket was updated.

lastBucket—This is a token bucket item recording the number of tokens in the token bucket at the time of 'lastT'.

The following are static parameters used in this algorithm:

maxBucket—This is a token bucket item recording the volume of the token bucket.

rate—This is a token bucket item recording the accumulation rate of DDR Access. This may be implemented as power of 2 making both multiplication and division more efficient.

Ctrip—quantity of DDR access attempts needed to invoke a DDR Access Count exception.

Figure 3A:
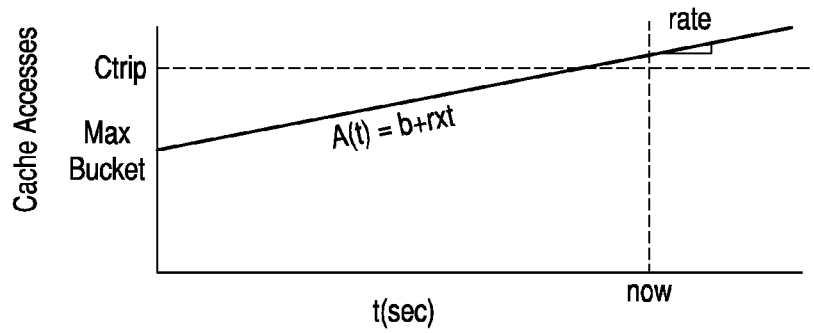
FIG. 3A is an example graph of cache accesses vs. time where the token bucket is greater than Ctrip.

Referring now to FIG. 3A, an example graph of cache accesses vs. time where the token bucket is greater than Ctrip, is illustrated. This figure shows a case where the allocated token bucket to a core is greater than the Ctrip value at the time of a DDR Access Count exception. In this case, when the DDR Access Count exception occurs, sufficient time has elapsed so that the accumulated transmission rate is more than Ctrip. In this case the core is allowed to immediately resume operation.

Figure 3B:
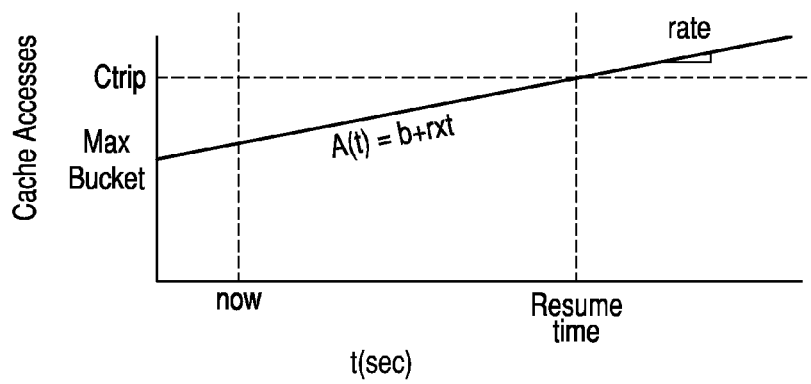
FIG. 3B is an example graph where the token bucket is less than Ctrip.

FIG. 3B is an example graph where the token bucket is less than Ctrip. The allocated token bucket to a core is less than the Ctrip value at the time of a DDR Access Count exception. In this case, when the DDR Access Count exception occurs, the accumulated transmission allowed by the token bucket is less than Ctrip. In this case the core is delayed until the time at which the token bucket will accumulate enough tokens to allow a Ctrip quantity of accesses.

The initialization logic below occurs at partition activation.
Initialization:
Crunning=Ctrip
lastT=0
lastBucket=maxBucket
Exception DDR Access Limit Event:
dt=now−last
dtXr=dt*r
lastT=now
ResumeTime=now+(Ctrip−(lastBucket+dtXr))/r
lastBucket=MIN(maxBucket, lastBucket+dtXr)
Crunning=Ctrip
if (ResumeTime>now) then
   lastBucket=0
   While (ResumeTime>now) Loop
     for (i=0; i<10000; i++)
   end of while
end of if The bound on the maximal DDR memory access performed by any core of a multicore processor in any interval T is computed as: max (Ctrip, b+r·t).

This serves as an upper bound for the DDR memory access performed by any core during interval [0,T].

The core memory access can be measured in bytes or cache lines.

Figure 4:
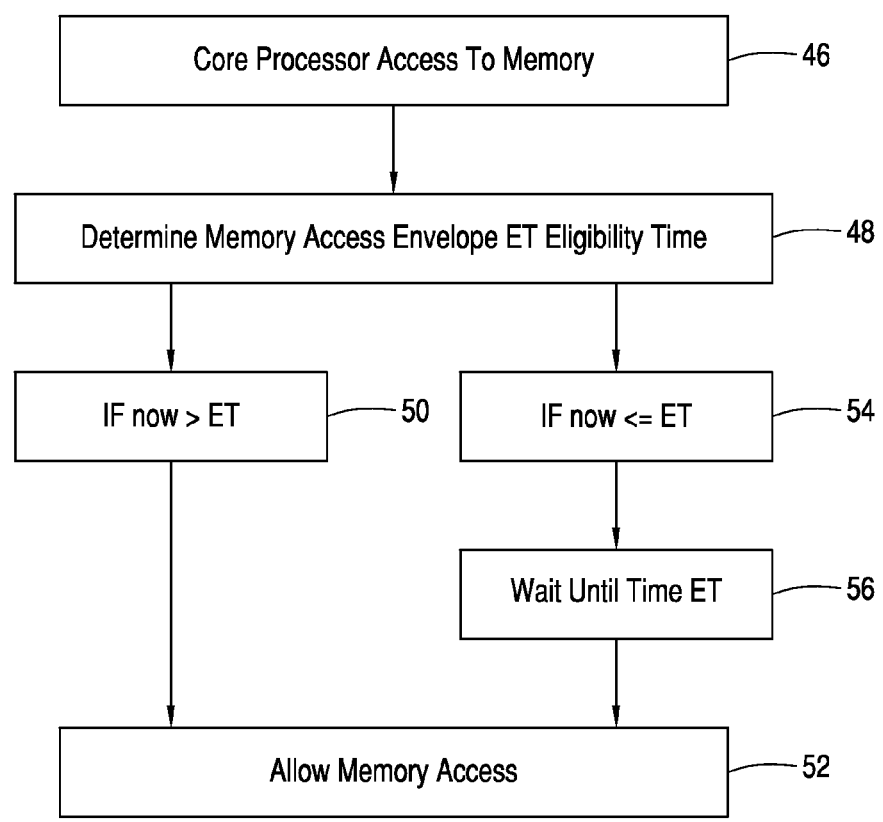
FIG. 4 is a flow diagram of a method of operation of a core processor rate limiter in accordance with another embodiment of the present invention where the core processor rate limiter is implemented in hardware without the assistance of software.

Referring now to FIG. 4, a method of operation of a core processor rate limiter in accordance with another embodiment of the present invention is shown where the core processor rate limiter is implemented in hardware without the assistance of software.

Each core processor rate limiter determines a memory access envelope eligibility time (ET) based on prior DDR access events occurring prior to the current time (process block 46). Memory access is allowed if it is determined that current time is greater than the ET (process blocks 48, 50 and 52). There is a wait until the ET is reached if it is determined that the current time is less than or equal to the ET (process blocks 54, 56, 52).

When the hosted software causes either instruction or data to be accessed from the core processor (L2 to L3 cache) the hardware in each core processor will implement the function shown in FIG. 4.

The core processor hardware will 'pause' until the eligibility time of the token bucket process before continuing to make the next access from the core processor to the cache (L3) or DDR which is common to the entire processor.

This limits the access of each core processor to the limitation imposed (in the interval domain) by the token bucket process. This allows a limited access by all other core processors relative to a core processor of interest in any interval of time.

Analysis of the multi-core processor system accounts for DDR bandwidth and latency changes due to rate limiting. A model of the multi-core processor, which is based on memory access rates and times, measures the difference between rate limited and non-rate limited systems. The analysis tool may be, for example, an off-line algorithm that runs on a PC tool.

Referring now again to FIG. 1, the multi-core processor system may include at least one master controller system 58 operatively connected to the common access bus 30 capable of performing memory accesses over the common access bus 30. The master controller system includes a master controller 60 and a master controller rate limiter 62. The core processor and master controller rate limiters 20, 62 are configured to constrain the rate at which data is accessed by each respective core processor 14 or master controller 60 from the memory system 22 so that each core processor or master controller memory access is capable of being limited to an expected value. The master controller 60 may comprise, for example, an I/O controller or a Direct Memory Access (DMA) controller.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software/and or firmware would be well within the skill of one skilled in the art in light of this disclosure.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communication link, a wireless communication link (e.g., transmitter, receiver, transmission logic, reception logic, etc.), etc.).

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Other embodiments and configurations may be devised without departing from the spirit of the invention and the scope of the appended claims.

The invention claimed is:

1. A multi-core processor system, comprising:
   a) a plurality of cores, each core comprising;
      i) a core processor;
      ii) a dedicated core cache operatively connected to the core processor; and,
      iii) a core processor rate limiter operatively connected to the dedicated core cache;
   b) a memory system, comprising:
      i) physical memory;
      ii) a memory controller connected to the physical memory; and,
      iii) a dedicated memory cache connected to the memory controller; and,
   c) a common access bus for interconnecting said plurality of cores and said memory system,
   wherein said core processor rate limiters are configured to constrain the rate at which data is accessed by each respective core processor from the memory system so that each core processor memory access is capable of being limited to an expected value, wherein each core processor memory access comprises an individual cache line memory access, and wherein each core processor rate limiter utilizes a token bucket process, said token bucket process including a) waiting until a core memory access count is reached following an initialization setting, wherein event counters in each core processor rate limiter are set to a predetermined value; b) determining a memory access envelope eligibility time (ET) when the core memory access count is reached; and c) waiting until said ET is reached.

2. The multi-core processor system of claim 1, wherein each core processor rate limiter comprises:
   a) means for said waiting until a core memory access count is reached following said initialization setting, wherein said event counters in each core processor rate limiter are set to said predetermined value;
   b) means for invoking an exception handler for each core processor when said core memory access count is reached;
   c) means for said determining said memory access envelope ET when the exception handler is invoked;
   d) means for returning from the exception handler if it is determined that the current time is greater than the ET; and,
   e) means for said waiting until the ET is reached if it is determined that the current time is less than the ET.

3. The multi-core processor system of claim 1, wherein said dedicated core cache comprises an L1 cache operatively connected to an L2 cache.

4. The multi-core processor system of claim 1, wherein said memory system comprises double data rate (DDR) memory.

5. The multi-core processor system of claim 1, wherein said memory system comprises double data rate (DDR) SDRAM memory.

6. The multi-core processor system of claim 1, wherein each core processor rate limiter is self-constrained to a defined traffic envelope having a burst and rate component.

7. The multi-core processor system of claim 1, wherein said core memory access is measured in bytes or cache lines.

8. The multi-core processor system of claim 1, wherein said plurality of cores, said memory system and said common access bus comprise an avionics multi-core processor system.

9. The multi-core processor system of claim 1, wherein each core processor rate limiter is self-constrained to a defined traffic constraint envelope, each traffic constraint envelope being n-way, non-decreasing, and concave.

10. A multi-core processor system, comprising:
    a) a plurality of cores, each core comprising;
       i) a core processor;
       ii) a dedicated core cache operatively connected to the core processor; and,
       iii) a core processor rate limiter operatively connected to the dedicated core cache;
    b) a memory system, comprising:
       i) physical memory;
       ii) a memory controller connected to the physical memory; and,
       iii) a dedicated memory cache connected to the memory controller;
    c) a common access bus for interconnecting said plurality of cores and said memory system; and,
    d) at least one master controller system operatively connected to said common access bus capable of performing memory accesses over said common access bus, said master controller system comprising a master controller and a master controller rate limiter,
    wherein said core processor rate limiter and said master controller rate limiter are configured to constrain the rate at which data is accessed by each respective core processor or master controller from the memory system so that each core processor or master controller memory access is capable of being limited to an expected value, wherein each core processor memory access comprises an individual cache line memory access, and wherein each core processor rate limiter utilizes a token bucket process, said token bucket process including a) waiting until a core memory access count is reached following an initialization setting, wherein event counters in each core processor rate limiter are set to a predetermined value; b) determining a memory access envelope eligibility time (ET) when the core memory access count is reached; and c) waiting until said ET is reached.

11. The multi-core processor system of claim 10, wherein said master controller comprises an I/O controller.

12. The multi-core processor system of claim 10, wherein said master controller comprises a Direct Memory Access (DMA) controller.

13. The multi-core processor system of claim 10, wherein said dedicated core cache comprises an L1 cache operatively connected to an L2 cache.

14. The multi-core processor system of claim 10, wherein said memory system comprises double data rate (DDR) memory.

15. The multi-core processor system of claim 10, wherein said memory system comprises double data rate (DDR) SDRAM memory.

16. The multi-core processor system of claim 10, wherein each core processor rate limiter is self-constrained to a defined traffic envelope having a burst and rate component.

17. A method for operating a multi-core processor system, comprising the steps of:
- a) providing a plurality of cores, each core comprising;
  - i) a core processor;
  - ii) a dedicated core cache operatively connected to the core processor; and,
  - iii) a core processor rate limiter operatively connected to the dedicated core cache;
- b) providing a memory system, comprising:
  - i) physical memory;
  - ii) a memory controller connected to the physical memory; and,
  - iii) a dedicated memory cache connected to the memory controller;
- c) providing a common access bus for interconnecting said plurality of cores and said memory system; and,
- d) constraining the rate at which data is accessed by each respective core processor from the memory system so that each core processor memory access is capable of being limited to an expected value, wherein each core processor memory access comprises an individual cache line memory access, and wherein each core processor rate limiter utilizes a token bucket process, said token bucket process including a) waiting until a core memory access count is reached following an initialization setting, wherein event counters in each core processor rate limiter are set to a predetermined value; b) determining a memory access envelope eligibility time (ET) when the core memory access count is reached; and c) waiting until said ET is reached.

18. The method of claim 17, wherein said token bucket process, comprises the steps of:
- a) said waiting until a core memory access count is reached following said initialization setting, wherein said event counters in each core processor rate limiter are set to said predetermined value;
- b) invoking an exception handler for each core processor when said core memory access count is reached;
- c) said determining a said memory access envelope ET when the exception handler is invoked;
- d) returning from the exception handler if it is determined that the current time is greater than the ET; and,
- e) said waiting until the ET is reached if it is determined that the current time is less than the ET.

* * * * *